US011162418B2

(12) United States Patent
Aubert et al.

(10) Patent No.: US 11,162,418 B2
(45) Date of Patent: Nov. 2, 2021

(54) FAN COMPRISING AN INTER-BLADE PLATFORM ATTACHED UPSTREAM BY A FERRULE

(71) Applicant: Safran Aircraft Engines, Paris (FR)

(72) Inventors: Fabrice Michel Francois Rene Aubert, Moissy-Cramayel (FR); Suzanne Madeleine Coustillas, Moissy-Cramayel (FR); Paul Antoine Foresto, Moissy-Cramayel (FR); Didier Pierre Mozer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/706,571

(22) Filed: Dec. 6, 2019

(65) Prior Publication Data

US 2020/0182149 A1 Jun. 11, 2020

(30) Foreign Application Priority Data

Dec. 7, 2018 (FR) ...................................... 1872555

(51) Int. Cl.
*F01D 5/06* (2006.01)
*F02C 7/04* (2006.01)
(Continued)

(52) U.S. Cl.
CPC .............. *F02C 7/04* (2013.01); *F01D 11/008* (2013.01); *B29L 2031/08* (2013.01);
(Continued)

(58) Field of Classification Search
CPC ................................. F01D 11/008; F02C 7/04
See application file for complete search history.

(56) References Cited

U.S. PATENT DOCUMENTS 5,466,125 A * 11/1995 Knott .................... F01D 5/3007
416/193 A
6,520,742 B1 * 2/2003 Forrester ............... F01D 21/045
416/220 R
(Continued)

FOREIGN PATENT DOCUMENTS

EP 2369155 A2 9/2011
EP 2372098 A2 10/2011
(Continued)

OTHER PUBLICATIONS

European Search Report received for EP Patent Application No. 19306555.4, dated Feb. 4, 2020, 2 pages of Original Document Only.
(Continued)

*Primary Examiner* — Woody A Lee, Jr.
(74) *Attorney, Agent, or Firm* — Womble Bond Dickinson (US) LLP

(57) ABSTRACT

A turbine engine fan having an axis of revolution wherein a fan disk having an upstream face and a radial face is configured to receive a series of fan blades. An inter-blade platform wherein an upstream end, a blocking ferrule, are applied and attached on the one hand to the upstream end of the platform and on the other hand to the upstream face of the fan disk, and an inlet cone. The blocking ferrule includes a radial ring and a lug, extending axially from the radial ring and configured to form a radial abutment for the inlet cone.

15 Claims, 6 Drawing Sheets

(51) Int. Cl.
  *F01D 11/00* (2006.01)
  *B29L 31/08* (2006.01)
  *F01D 5/30* (2006.01)
  *F02K 3/06* (2006.01)
  *F04D 29/32* (2006.01)

(52) U.S. Cl.
  CPC ............ *F01D 5/066* (2013.01); *F01D 5/3007* (2013.01); *F02K 3/06* (2013.01); *F04D 29/329* (2013.01); *F05D 2220/36* (2013.01); *F05D 2240/80* (2013.01); *F05D 2260/31* (2013.01); *F05D 2300/43* (2013.01); *F05D 2300/44* (2013.01); *F05D 2300/603* (2013.01)

(56) References Cited

U.S. PATENT DOCUMENTS

| | | | | |
|---|---|---|---|---|
| 7,163,375 | B2* | 1/2007 | Queriault | F01D 11/008 416/193 A |
| 7,553,125 | B2* | 6/2009 | Audic | F01D 11/008 415/118 |
| 2008/0226458 | A1* | 9/2008 | Pierrot | F01D 11/008 416/220 R |
| 2010/0290910 | A1* | 11/2010 | Hoyland | F01D 11/008 416/193 R |
| 2011/0085914 | A1* | 4/2011 | Breakwell | F02C 7/04 416/248 |
| 2011/0146299 | A1* | 6/2011 | Hoyland | F01D 11/006 60/797 |
| 2012/0275921 | A1 | 11/2012 | Steen et al. | |
| 2013/0202449 | A1* | 8/2013 | Lombard | F01D 5/025 416/244 R |
| 2014/0186187 | A1* | 7/2014 | Lamboy | F02K 3/06 416/219 R |
| 2016/0069355 | A1* | 3/2016 | Duo | F04D 29/023 415/200 |
| 2016/0160663 | A1* | 6/2016 | Mortier | F01D 11/008 416/219 R |
| 2017/0114800 | A1* | 4/2017 | Burkholder | F04D 29/321 |
| 2017/0306776 | A1* | 10/2017 | Simonds | F16B 37/14 |
| 2018/0245513 | A1* | 8/2018 | Servant | F02C 7/04 |

FOREIGN PATENT DOCUMENTS

| | | |
|---|---|---|
| EP | 2837773 A1 | 2/2015 |
| EP | 3163016 A1 | 5/2017 |
| FR | 2898977 A1 | 9/2007 |
| FR | 3029563 A1 | 6/2016 |
| GB | 2363170 A | 12/2001 |
| WO | 2006/136755 A2 | 12/2006 |
| WO | 2015/088680 A1 | 6/2015 |

OTHER PUBLICATIONS

Preliminary Research Report received for French Application No. 1872555, dated Sep. 3, 2019, 2 pages (1 page of French Translation Cover Sheet and 1 page of original document).

* cited by examiner

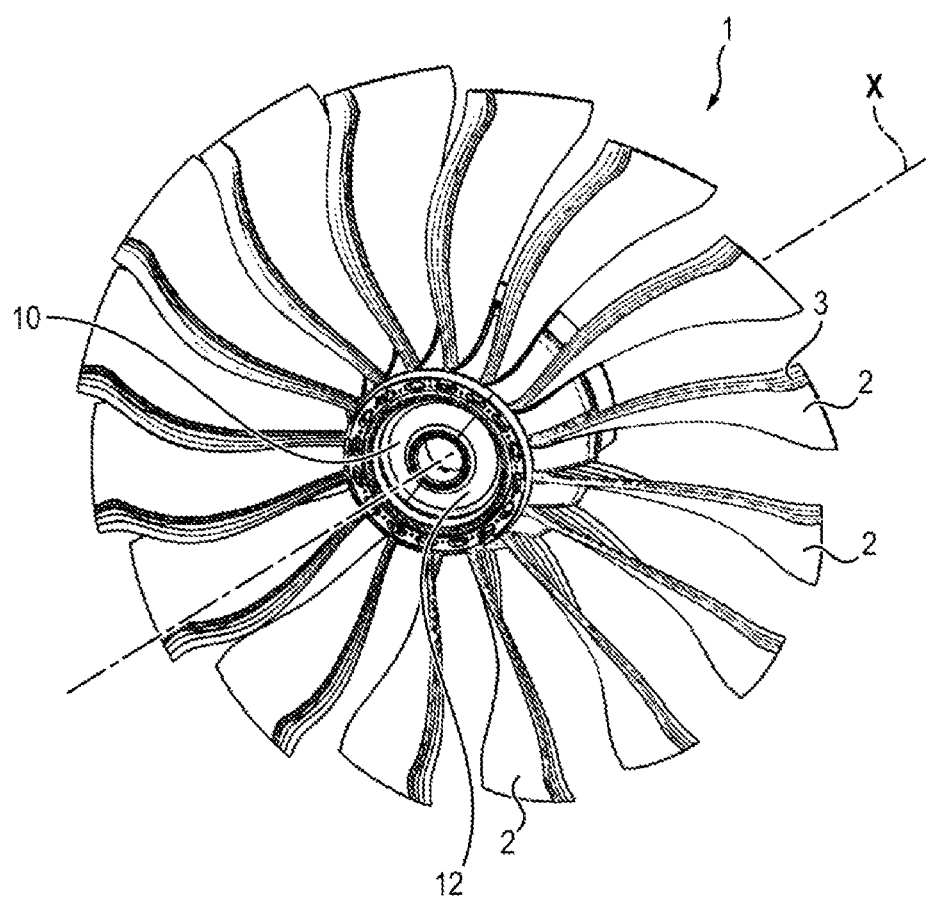
[Fig. 1]

[Fig. 2]
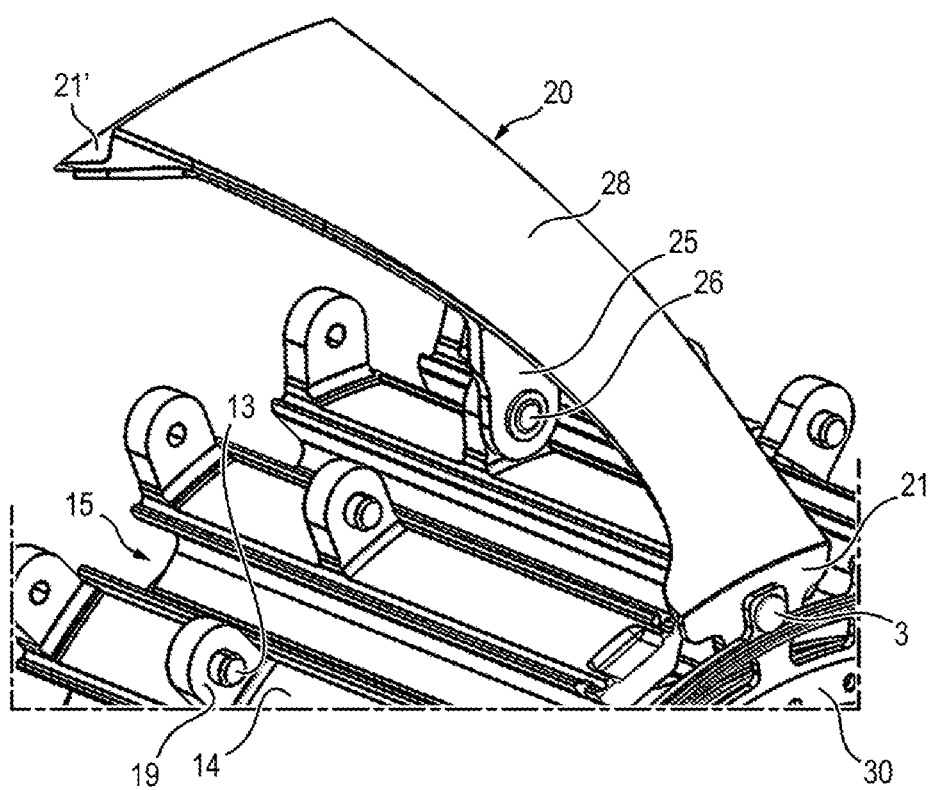

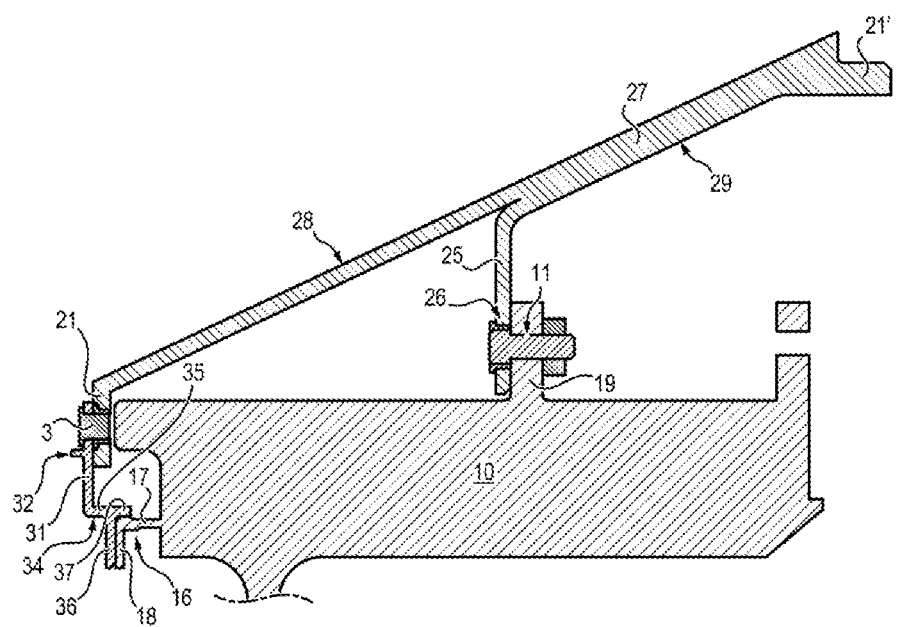
[Fig. 3]

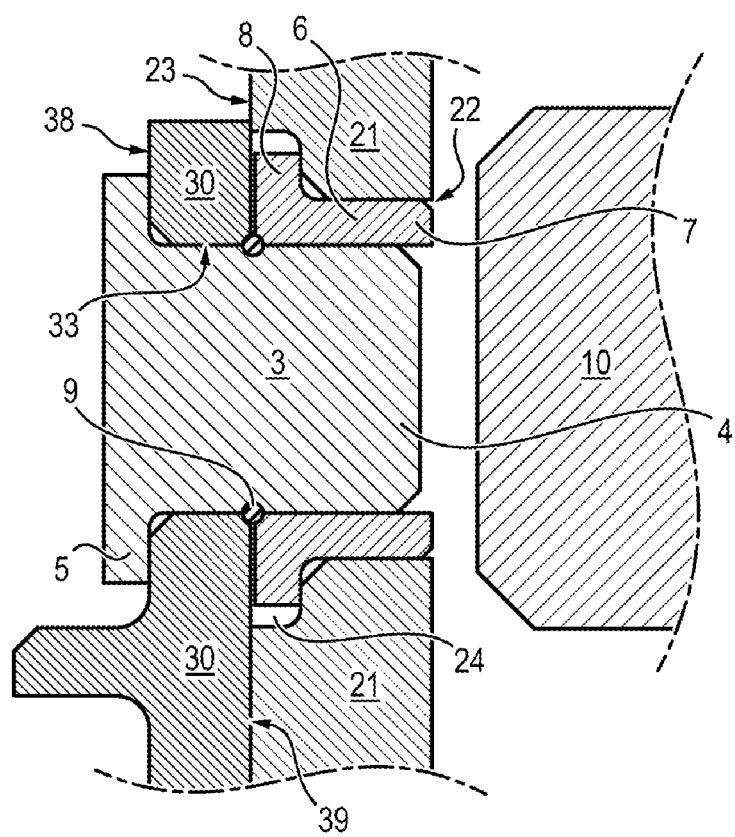
[Fig. 4a]

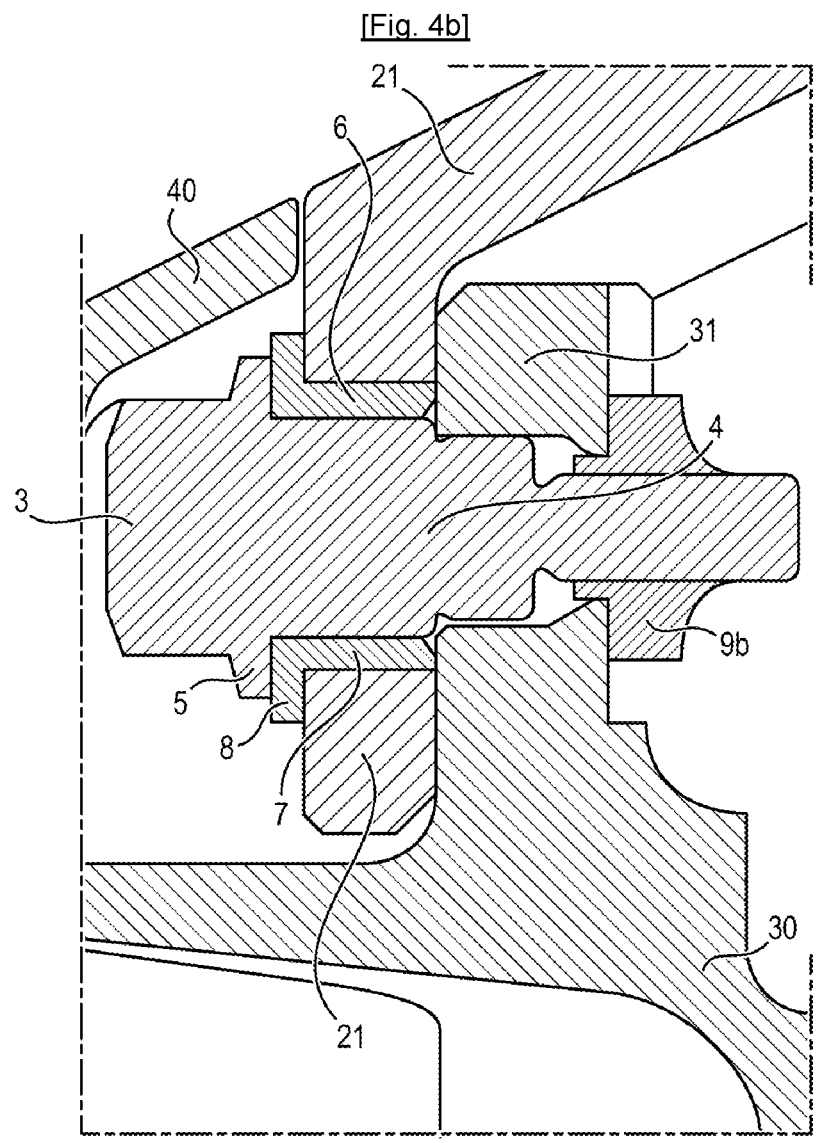

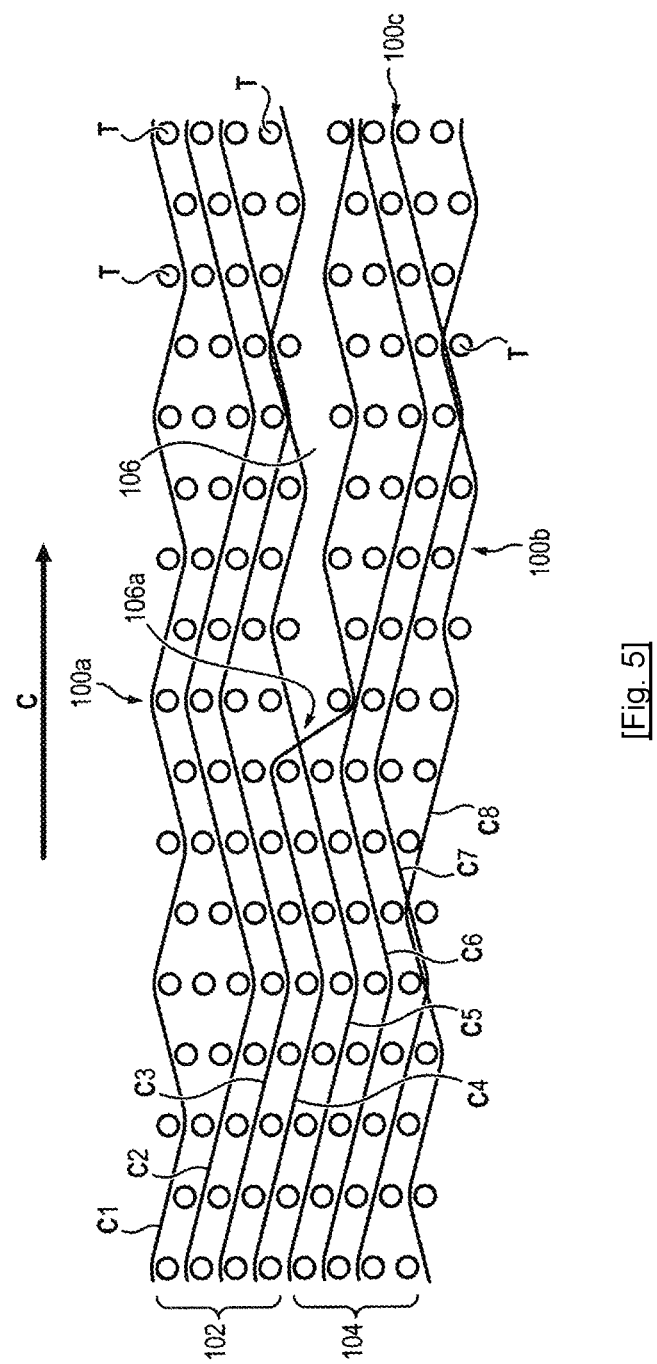

FAN COMPRISING AN INTER-BLADE PLATFORM ATTACHED UPSTREAM BY A FERRULE

FIELD OF THE INVENTION

The invention relates to the general field of inter-blade platforms in fans of aeronautical turbine engines, particularly when these platforms are produced in a composite material comprising a fibrous reinforcement densified by a matrix.

TECHNOLOGICAL BACKGROUND

A fan of a turbine engine comprises a rotor disk carrying a plurality of blades the roots of which are engaged and retained in substantially axial slots formed on the periphery of the disk. These blades are associated at their inner radial ends with inter-blade platforms, which are disposed in the continuation of the inlet cone.

The platforms particularly allow the delimitation, on the inside, of the annular air inlet stream into the fan, this stream being delimited on the outside by a casing. These platforms generally comprise a base configured to delimit the stream and a shell extending radially toward the interior from the base so as to allow support of the platform on the fan disk. The shell is also configured to stiffen the platform in order to ensure the continuity of the aerodynamic flow in the fan.

It is known to create inter-blade platforms of fans of composite material. The composite material generally comprises a fibrous reinforcement densified by a matrix. Depending on the application considered, the preform can be made of glass, carbon or ceramic fibers and the matrix can be made of an organic material (polymer), carbon or ceramic. For parts with relatively complex shapes, it is also known to create a fibrous structure or blank in a single piece by three-dimensional or multilayer weaving and to form the fibrous structure to obtain a fibrous preform having a shape near that of the part to be manufactured.

Performance and integration requirements are manifested by a tendency to reduce the hub ratio, which corresponds to a ratio between the inner radius and the outer radius of the aerodynamic stream, where the inner radius corresponds to the distance between the axis of revolution of the fan and the surface of the platform which delimits the flow stream, at the leading edge of the fan blade, and the outer radius corresponds to the distance between the axis of revolution of the fan and the fan casing, at the same place on the blade (namely at the leading edge of the blade, at the intersection with the platform). The smaller the hub ratio, the greater the performance of the fan.

The reduction of this hub ratio very often necessitates reducing the force passing upstream of the platform and in taking a portion of this force elsewhere on the disk. With a fixed disk plane, axis of revolution and aerodynamic stream, the hub ratio will be a function of the distance (height) between the surface of the platform which delimits the flow stream and the radial surface of the fan disk. In particular, if this height increases, the hub ratio decreases.

For example, document US 2012/0275921 illustrates a fan disk in which the platform is taken up upstream and downstream, However, the upstream fixing is voluminous so as to allow the taking up of centrifugal forces, which unfavorably impacts the hub ratio.

Document US 2014/0186187, for its part, proposes the taking up of a portion of the centrifugal forces on an extension protruding from a downstream portion of the disk. A configuration of this type allow reducing the bulk of the upstream attachment and thereby reducing the hub ratio. However, this configuration risks degrading the flow of air by the presence of cavities or poor control of the surface aspect.

Also proposed in document FR 3 029 563 in the name of the Applicant is to mount the platform on a pin machined in the mass of the disk. However, the greater the chord of the fan blade, the more the curvature of the blade will be pronounced and the greater the necessary clearance for axial mounting of the fan blade will be. This configuration therefore requires sufficient clearance, which may prove too large to fill according to the configurations to allow axial mounting of the platform, which results in the clearances opening at the suction side trailing edges of the fan blades.

Finally, it can prove difficult to accurately position the inter-blade platforms relative to the hub disk. This is the case in particular when the platform is taken up upstream and downstream, because the platform presses against its attachment points under the influence of centrifugal forces, thus creating risks of seal degradations, of creating a step in the secondary flow stream and a perturbation of the flow in the fan and at the inlet of the low-pressure compressor or of the booster. Yet the lack of accuracy in the attachment of the inter-blade platforms relative to the fan disk harms the centering of the inlet cone.

SUMMARY OF THE INVENTION

One objective of the invention is therefore to propose a fan having a the smallest possible hub ratio, in which the inter-blade platforms can be easily attached to the fan disk without degrading the flow stream regardless of their material, while still limiting the necessary clearances for mounting the fan blades and while allowing accurate centering of the inlet cone.

To this end, the invention proposes a turbine engine fan having an axis of revolution and comprising:
- a fan disk having an upstream face and a radial face configured to receive a series of fan blades,
- an inter-blade platform comprising an upstream end,
- an inlet cone and
- a blocking ferrule cooperating with the platform.

The blocking ferrule is applied and attached on the one hand to the upstream end of the platform and on the other hand to the upstream face of the fan disk, and the blocking ferrule comprises a radial ring and a lug, extending axially from the radial ring and configured to form a radial abutment for the inlet cone.

Certain preferred but non-limiting features of the fan described above are the following, taken individually or in combination:
- the blocking ferrule is applied and attached to the upstream end of the platform by means of an attachment system which extends radially outside the lug.
- the upstream end of the platform comprises a wall configured to extend facing the upstream face of the fan disk, a first opening is formed in the wall of the upstream end, a second opening is formed in the blocking ferrule, and the fan also comprises a pin configured to penetrate into the first opening and into the second opening so as to block the platform relative to the fan disk by means of the blocking ferrule.
- the fan also comprises a socket housed at least partially in the first opening, said socket being configured to be supported against an upstream face of the upstream end and the pin being housed at least partially in the socket.

- the fan also comprises a circlip threaded over the pin, said circlip extending between the socket and the pin, and/or a nut threaded over the pin, said nut being attached to the upstream end of the platform.
- a groove is formed in the upstream face of the upstream end, said groove being configured to cooperate with a head of the socket.
- the fan disk comprises an angled flange including an axial branch extending axially from its upstream face and a radial branch extending radially from the axial branch, the blocking ferrule comprises an bent wall comprising an axial section extending axially from the ring, a radial section extending radially from the axial section and a finger extending in the continuation of the axial section, the finger being configured to come into radial abutment against the axial branch while the radial section is configured to come into axial abutment against the radial branch.
- the inter-blade platform comprises a base and at least one stiffener extending radially from the base and configured to cooperate with the fan disk.
- the fan also comprises: a yoke extending radially from the radial face of the disk and in which is formed a third opening, and an additional pin, the stiffener comprising a tab in which is formed a fourth through opening and the additional pin being configured to penetrate into the third opening and into the fourth opening so as to block the platform relative to the fan disk.
- the base and the stiffener are formed integrally and in a single piece.
- the inter-blade platform is made of a composite material comprising a fibrous reinforcement densified by a polymer matrix.

BRIEF DESCRIPTION OF THE DRAWINGS

Other features, aims and advantages of the present invention will appear more clearly upon reading the detailed description that follows, and with reference to the appended drawings given by way of non-limiting examples and in which:

FIG. 1 illustrates an exemplary embodiment of a fan conforming to an embodiment of the invention.

FIG. 2 is a perspective view in detail of an exemplary embodiment of an inter-blade platform conforming to the invention, during attachment to a fan disk.

FIG. 3 is a section view of the inter-blade platform and of the fan disk of FIG. 2 when the inter-blade platform is attached to the fan disk.

FIG. 4a is a detail view of FIG. 3 showing the attachment of the inter-blade platform to the fan disk.

FIG. 4b is a detail view of a variant embodiment of the attachment of the inter-blade platform to the fan disk.

FIG. 5 is a schematic view of an example of a three-dimensionally woven fibrous blank according to an embodiment of the invention.

DETAILED DESCRIPTION OF AN EMBODIMENT

In the present application, upstream and downstream are defined with relative to the normal gas flow direction in the fan 1 through the turbine engine. Moreover, the X axis of radial symmetry of the fan 1 is called the axis of revolution of the turbine engine fan 1. The axial direction corresponds to the direction of the axis X of the fan 1, and a radial direction is a direction perpendicular to this axis and passing through it. Likewise, an axial plane is a plane containing the axis X of the fan 1 and a radial plane is a plane perpendicular to this X axis and passing through it. Unless otherwise stated, internal (or inner) and external (or outer) respectively, are used with reference to a radial direction so that the inner (i.e. radially inner) portion or face of an element is closer to the X axis than the outer (i.e. radially outer) portion or face of the same element.

A fan 1 of a turbine engine comprises a fan disk 10 having an upstream face 12 and a radial face 14. The fan disk 10 carries a plurality of fan blades 2, associated with inter-blade platforms.

The blades 2 are engaged in axial slots 15 formed in the radial face 14 of the fan 1 disk 10. Optionally, the fan disk 10 can comprise a sacrificial protective sheet, or foil. In a manner known per se, the protective sheet has the function, during operation, of protecting the radial face 14 of the disk 10 by deteriorating before the disk 10.

Each blade 2 has a root, engaged in one of the slots 15, a head (or tip), a leading edge 3 and a trailing edge. The leading edge 3 is configured to extend facing the flow of gases entering the turbine engine. It corresponds to the anterior portion of an aerodynamic profile which faces the flow of air and which divides the flow of air into a pressure side flow and a suction side flow. The trailing edge, for its part, corresponds to the posterior portion of the aerodynamic profile, where the pressure side and suction side flows rejoin.

The blades 2 are associated at their inner end with inter-blade platforms 20, which are disposed in the continuation of an inlet cone 40.

Each platform 20 has an upstream end 21, configured to extend at the upstream face 12 of the fan disk 10, and a downstream end 21' configured to face a part, extending downstream, of the fan 1.

Generally, the downstream part of the fan 1 comprises an inner ferrule of an IGV (Inlet Guide Vane, i.e. the first stator stage of the booster in the primary body of a turbine engine) or, as a variant, a rotating spacer which is formed from an annular flange extending between the fan 1 and the inner ferrule of the IGV and which turns at the same speed as the fan 1 disk 10. The downstream end 21' of the platform 20 and this part (whether it is the inner ferrule of the IGV or the rotating spacer) can therefore be formed so that each extends in the continuation of the other so as to limit the cavities at the inlet of the primary body of the turbine engine likely to perturb the primary flow. As a variant, in the case where the part is the rotating spacer, the downstream end 21' of the platform 20 can be configured to be supported against the part.

The fan also includes a blocking ferrule 30, applied and attached on the one hand to the upstream end 21 of the base of the platform 20, and on the other hand to the upstream face 12 of the fan 1 disk 10.

In order to allow the axial and radial centering of the inlet cone 40 of the fan 1, the blocking ferrule 30 comprises a ring 31 extending radially relative to the axis X and a lug 32. The lug 32 extends radially from the ring 31 and is configured to receive a downstream edge of the inlet cone 40 and to form an axial abutment for this downstream edge. Moreover, the ring 31 is configured to form a radial abutment for the downstream edge of the inlet cone 40. In this manner, the radial and axial positions of the inlet cone 40 no longer depend on the position of the upstream end 21 of the platform 20, thus facilitating control of the dimension chain.

In one embodiment, the fan 1 disk 10 comprises an angled flange 16 including an axial branch 17 extending axially from its upstream face 12 and a radial branch 18 extending radially inward from the axial branch 17.

Moreover, the blocking ferrule 30 comprises an bent wall 34 comprising an axial section 35 extending axially downstream from the ring 31 and a radial section 36 extending radially inward from the axial section 35. The axial section 35 is extended downstream beyond the radial section 36 by a finger 37. In a variant embodiment not shown in the figures, the radial branch 18 can extend radially outward from the axial branch 17, in which case the radial section 36 also extend outward from the axial section 35, the finger 37 then being supported on the lower face of the axial branch 17.

In order to further improve control of the dimension chain and hence the centering of the inlet cone 40, the finger 37 is configured to come into radial abutment against the axial branch 17 of the angled flange 16 of the fan 1 disk 10 while the radial section 36 of the bent wall 34 of the blocking ferrule 30 is configured to come into axial abutment against the radial branch 18 of the angled flange 16 of the fan 1 disk 10. In fact, the angled flange 16 of the fan 1 disk 10 and the bent wall 34 of the blocking ferrule 30 can be precisely machined so that the position of the interface between the radial branch 18 of the angled flange 16 and the axial section 35 of the bent wall 34, on the one hand, and the interface between the finger 37 and the axial branch 17 of the angled flange 16 can be controlled and determined with accuracy. It follows that the position of the lug 32 and of the finger 37, and therefore the centering of the inlet cone 40, can be controlled radially and axially.

The blocking ferrule 30 is annular. The ring 31, the lug 32 and the bent wall 34 therefore have axial symmetry around the axis X. If necessary, the ring 31, the lug 32 and/or the bent wall 34 can be discontinuous.

Likewise, the angled flange 16 of the disk 10 has axial symmetry around the axis X, and can if necessary be discontinuous.

Preferably, the blocking ferrule 30 is metallic, made of titanium for example, typically by selecting the same material as that of the disk 10.

In order to attach the platform 20 in position relative to the fan 1 disk 10, the upstream end 21 of the base of the platform 20 can comprise a wall configured to extend facing the upstream face 12 of the fan 1 disk 10. Moreover, a first opening 22 is formed in the wall of the upstream end 21 and a second opening 33 is formed in the blocking ferrule 30. Finally, the fan 1 comprises a pin 3 configured to penetrate into the first opening 22 and into the second opening 33 so as to block the platform 20 relative to the fan 1 disk 10 by means of the blocking ferrule 30.

According to an embodiment illustrated in FIG. 4a, the platform 20 can be attached to the blocking ferrule 30 by means of an attachment system comprising the pin 3, a socket 6 and the circlip 9. More precisely, the socket 6 comprises a cylindrical body 7, for example a cylinder of revolution, and a head 8 with a central passage passing through it. The pin 3 comprises a cylindrical body 4, for example a cylinder of revolution, configured to be inserted with adjustment into the central passage of the socket 6, and a head 5 configured to be supported against the ring 31 of the blocking ferrule 30. Finally, the circlip is substantially annular and is configured to be threaded with adjustment over the cylindrical body 4 of the pin 3.

The platform 20 can then be attached as follows to the blocking ferrule 30: first of all, the socket 6 is introduced into the first opening 22 formed in the upstream end 21 so that its head 8 comes into abutment against an upstream face 23 of the upstream end 21. If necessary, a groove 24 the shape and dimensions of which correspond to the shape and dimensions of the socket 6 can be made in the upstream face 23 of the upstream end 21, around the first opening 22, in order to form a seat for the socket 6. The pin 3 can then be inserted into the second opening 33 of the blocking ferrule 30, from the upstream face 38 of the ring 31, until its head 5 comes into abutment against said upstream face 38. The circlip 9a can then be threaded over the cylindrical body 4 of the pin 3, until it comes into abutment against a downstream face 39 of the ring 31. Finally, the pin 3 is introduced into the socket 6 passing through the head 8 of the socket 6, until the circlip 9a comes into contact with the head 8 of the socket 6. In this configuration, the downstream face 39 of the ring 31 of the blocking ferrule 30 is therefore in surface contact with the upstream face 23 of the upstream end 21 of the platform 20, which blocks, axially and radially, the platform 20 relative to the blocking ferrule 30.

In a variant embodiment (FIG. 4b), the attachment system comprises a nut 9b instead of or in addition to the circlip 9a in order to attach the platform 20 to the blocking ferrule 30. More precisely, the pin 3 is then centered by the cylindrical body 7 of the socket 6 and by the blocking ferrule 30 before being engaged in the nut 9b, thus allowing accurate positioning of the assembly.

The platform 20 can then be attached as follows on the blocking ferrule 30 as follows: first of all, the socket 6 is introduced into the first opening 22 formed in an upstream face 23 of the upstream end 21 so that its head 8 comes into contact against an upstream face 23 of the upstream end 21. If necessary, a groove 24, the shape and dimensions of which correspond to the shape and dimensions of the socket 6 can be created in the upstream face 23 of the upstream end 21, around the first opening 22, so as to form a seat for the socket 6. The upstream face 38 of the ring 31 can then be placed against a downstream face of the upstream end 21 of the platform 20, so that its second opening 33 is substantially coaxial with the first opening 22. The pin 3 can then be inserted into the body 7 of the socket 6 so as to pass through the first opening 22 and the second opening 33, until its head 5 comes into abutment against the head of the socket. Finally, the nut 9a is threaded over the free end of the cylindrical body 4 of the pin 4 in order to block it in position, then crimped on the upstream end 21 of the platform 20. In this configuration, the upstream face of the upstream end 21 of the platform 20 is therefore in surface contact with the head 8 of the socket 6 and its downstream face 39 is in surface contact with the upstream face 38 of the ring 31 of the blocking ferrule 30 which blocks, axially and radially, the platform 20 relative to the blocking ferrule 30.

The platform 20 can also be attached to the fan 1 disk 10 downstream of the upstream face 12 of the disk 10.

The platform 20 can be formed integrally and in a single piece, for example in a composite material comprising a fibrous reinforcement densified by a matrix, or a variant made of metal.

The fibrous reinforcement can be formed based on a fibrous preform obtained by three-dimensional weaving with a variable thickness. It can in particular comprise carbon, glass, aramid and/or ceramic fibers. The matrix, for its part, is typically a polymer matrix, for example epoxy, bismaleimide or polyimide. The blade 1 is then formed by molding by means of a process of vacuum resin injection of resin of the RTM (Resin Transfer Molding), or even VARRTM (for Vacuum Resin Transfer Molding) type.

In a first exemplary embodiment, the platform 20 can conventionally have a π-shaped cross section with a base and two flanks forming stiffeners which extend from one face of the base and serve to stiffen the platform 20 so as to avoid any displacement thereof under centrifugal force due to the speed of rotation of the fan 1. If necessary, in order to reinforce the resistance of the platform 20 to centrifugal forces, the platform 20 can also comprise a bottom connecting the free ends of the flanks to form a closed shell under the base of the platform 20.

Document FR 2 898 977 in the name of the Applicant, which describes an exemplary embodiment of a platform 20 of this type made in a single piece of composite material, can be referred to in particular.

In a second exemplary embodiment illustrated in the figures, the platform 20 comprises a tab 25 which is attached to a yoke 19 extending radially from the radial face 14 of the fan 1 disk 10.

To this end, the yoke 19 is formed integrally in a single piece with the fan 1 disk 10, at a distance from the upstream face 12, for example by machining. A third opening 11 is formed in the yoke 19.

Moreover, the platform 20 comprises a base 27 having a first surface 28 configured to radially delimit inside the flow stream in the fan 1 and a second surface 29 opposite to the first surface 28, as well as the tab 25 extending radially relative to the axis of revolution X on the side of the second surface 29 of the base 27. A fourth opening 26 is formed in the tab 25.

The tab 25 is configured to come into contact with the yoke when the platform 20 is attached to the fan 1 disk 10, so that the fourth opening 26 of the table 25 is coaxial with the third opening 11 of the yoke 19. A pin 13 can then be inserted into the third opening 11 and into the fourth opening 26 so as to attach the tab 25 to the yoke 19.

In one embodiment, the tab 25 and the base 27 can be made of a composite material comprising a fibrous reinforcement densified by a polymer matrix. They are then formed integrally in a single piece based on the same fibrous preform.

The fibrous reinforcement can be formed based on a fibrous preform obtained by three-dimensional weaving with variable thickness. In order to create the base 27 and the tab 25 in a single piece, an open disconnection can be formed so as to allow the creation, based on the same three-dimensional preform, of these two portions of the platform 20. It will in particular be possible to refer to FIG. 5, which shows schematically a warp plan of a three-dimensionally woven fibrous blank from which a fibrous platform 20 preform can be formed, prior to injection of the resin or densification by a matrix and possible machining, so as to obtain a fan 1 platform 20 made of a composite material as illustrated in FIGS. 1 to 4. Three-dimensional weaving will be understood to mean that the warp threads $C_1$-$C_8$ follow sinuous paths in order to interconnect the weft threads T belonging to different layers of weft threads, with the exception of disconnections 106, noting that three-dimensional weaving, particularly with an interlock weave, can include 2D surface weaving. Different weaves of three-dimensional weaving can be used, such as interlock, multi-satin or multi-web weaves for example, as described in particular in document WO 2006/136755. In FIG. 5, the fibrous blank has two opposite surfaces 100a, 100b and comprises a first portion 102 and a second portion 104. These two portions 102, 104 respectively form a first and a second portion of the thickness of the fibrous blank between its opposite surfaces 100a, 100b.

Each portion 102, 104 of the fibrous blank comprises a plurality of superimposed layers of weft T threads, four in the example illustrated, the number of weft T threads being able to be any number, at least equal to two, desired depending on the desired thickness. In addition, the numbers of layers of weft thread in the portions 102 and 104 can be different from one another. The weft T threads are disposed in columns each comprising weft T threads of the first and of the second portion 102, 104 of the fibrous blank. In one portion of the dimension of the fibrous blank in the warp C direction, the first portion 102 and the second portion 104 of the fibrous blank are totally separated from one another by an open disconnection 106 which extends from an upstream limit 106a until a downstream edge 100c of the fibrous blank. By open disconnection 106 is meant a zone closed at one end and open at an opposite end which is through which warp threads $C_1$-$C_8$, interlinking weft T threads of layers belonging respectively to two of the layers, do not pass, the second portion 104 and the second portion 104 of the fibrous blank in the example here.

Apart from the open disconnection 108, the layers of weft T threads are interlinked by warp threads of a plurality of layers of warp threads $C_1$ to $C_8$. I the example more precisely illustrated in FIG. 5, the same first warp thread $C_4$ interlinks layers of weft T threads of the first portion 102 of the fibrous blank adjacent to the disconnection 106 and layers of weft T threads of the second portion 102 of the fibrous blank beyond the disconnection 106, i.e. before the upstream limit 106a. Of course, this connection could be accomplished by several first warp threads.

Conversely, the same second warp thread $C_5$ interlinks layers of weft T threads of the second portion 104 of the fibrous blank adjacent to the open disconnection 106 and layers of weft T threads of the first portion 102 of the fibrous blank beyond the closed disconnection. Of course, this connection could be accomplished by several second warp threads. Thus the path of the warp thread $C_5$ and that of the warp thread $C_6$ cross at the upstream limit 106a of the open disconnection 106.

The fibrous preform therefore comprises, in the direction of the warp threads C, a first portion in which the first portion 102 and the second portion 104 are rigidly joined so as to form, after injection of the matrix, the downstream portion of the platform 20, and a second portion extending between the upstream limit 106a of the disconnection 106 and the downstream edge 100c of the preform, intended to form the upstream portion of the base 27 and the tab 25. To this end, it is sufficient, after weaving, to separate the two portions 102 and 104 and to give them the desired shape (and more particularly to form an angle between the isolated portion of the first portion 102 of the preform intended to form the base 27 and the isolated portion of the second portion 104 of the preform intended to form the tab 25), the placing the preform in the desired configuration in a suitable mold in order to inject the matrix into it under vacuum, in conformity with the methods customarily used (for example by a method of the RTM or VARRTM type).

The fourth opening 26 can then be created by machining in the tab 25.

The thickness of the upstream portion of the base 27 and of the tab 25 of the platform 20 can be determined by selecting the number of layers in the first portion 102 and the second portion 104, respectively, as well as the number and the diameter (tex) of the strands in the warp and weft threads in each of these portions. The thickness of the upstream portion can therefore be different from that of the downstream portion.

After attachment of the platform 20 to the fan 1 disk 10 thanks to the blocking ferrule 30 and the closed shell or the tab 25, the inlet cone 50 is applied and attached to the blocking ferrule 30 so as to extend in the continuation of the base 27 of the platform 20 by limiting the cavities likely to perturb the flow at the inlet of the fan 1.

To this end, in order to ensure the axial and radial centering of the inlet cone 40, its downstream end is put into axial abutment against the ring 31 and in radial abutment against the lug 32 of the blocking ferrule 30.

In one embodiment, when the inlet cone 40 is in position in the fan 1, it covers the upstream end 21 of the platform 20 and the blocking ferrule 30.

The invention claimed is:

1. A fan of a turbine engine comprising:
   a fan disk having an upstream face and a radial face configured to receive a series of fan blades, wherein the fan disk comprises an angled flange including an axial branch extending axially from an upstream face of the fan disk and a radial branch extending radially from the axial branch;
   an inter-blade platform comprising an upstream end, a base and at least one stiffener extending radially from the base and configured to cooperate with the fan disk, wherein the stiffener comprises a tab in which is formed a first opening;
   an inlet cone;
   a blocking ferrule cooperating with the inter-blade platform, wherein the blocking ferrule is applied and attached to the upstream end of the inter-blade platform and the upstream face of the fan disk, and wherein the blocking ferrule comprises a radial ring and a lug, wherein the lug extends axially from the radial ring and is configured to radially abut the inlet cone, wherein the blocking ferrule comprises a bent wall comprising an axial portion extending axially from the radial ring, a radial portion extending radially from the axial portion and a finger extending in the continuation of the axial portion, the finger being configured to radially abut against the axial branch and the radial portion being configured to axially abut against the radial branch;
   a yoke extending radially from the radial face of the disk, a second opening being formed in the yoke; and
   a pin configured to penetrate into the first and second openings so as to block the inter-blade platform relative to the fan disk.

2. The fan according to claim 1, wherein the blocking ferrule is applied and attached to the upstream end of the inter-blade platform by means of an attachment system which extends radially outside the lug.

3. The fan according to claim 1, wherein:
   the upstream end of the inter-blade platform comprises a wall configured to extend in front of the upstream face of the fan disk;
   a third opening is formed in the wall;
   a fourth opening is formed in the blocking ferrule; and
   the fan further comprises an additional pin configured to penetrate into the third and fourth openings so as to block the inter-blade platform relative to the fan disk by means of the blocking ferrule.

4. The fan according to claim 3, further comprising a socket at least partially housed in the third opening, said socket being configured to abut an upstream face of the upstream end and the additional pin being at least partially housed in the socket.

5. The fan according to claim 4, further comprising a circlip sleeved over the additional pin, said circlip extending between the socket and the additional pin and a nut threaded over the additional pin, said nut being attached to the upstream end of the inter-blade platform.

6. The fan according to claim 4, wherein a groove is formed in the upstream face of the upstream end, said groove being configured to cooperate with a head of the socket.

7. The fan according to claim 1, wherein the base and the stiffener integrally are formed in a single piece.

8. The fan according to claim 1, wherein the inter-blade platform is made of a composite material comprising a fibrous reinforcement densified by a polymer matrix.

9. The fan according to claim 4, further comprising a circlip sleeved over the additional pin, said circlip extending between the socket and the additional pin or a nut threaded over the additional pin, said nut being attached to the upstream end of the inter-blade platform.

10. A gas turbine engine comprising a fan comprising:
    a fan disk having an upstream face and a radial face configured to receive a series of fan blades, wherein the fan disk comprises an angled flange including an axial branch extending axially from an upstream face of the fan disk and a radial branch extending radially from the axial branch;
    an inter-blade platform comprising an upstream end, a base and at least one stiffener extending radially from the base and configured to cooperate with the fan disk, wherein the stiffener comprises a tab in which is formed a first opening;
    an inlet cone;
    a blocking ferrule cooperating with the inter-blade platform, wherein the blocking ferrule is applied and attached to the upstream end of the inter-blade platform and to the upstream face of the fan disk, the blocking ferrule comprising a radial ring and a lug extending axially from the radial ring and configured to radially abut the inlet cone, wherein the blocking ferrule comprises a bent wall comprising an axial portion extending axially from the radial ring, a radial portion extending radially from the axial portion and a finger extending in the continuation of the axial portion, the finger being configured to radially abut against the axial branch and the radial portion being configured to axially abut against the radial branch;
    a yoke extending radially from the radial face of the disk, a second opening being formed in the yoke; and
    a pin configured to penetrate into the first and second openings so as to block the inter-blade platform relative to the fan disk.

11. A fan of a turbine engine comprising:
    a fan disk having an upstream face and a radial face configured to receive a series of fan blades;
    an inter-blade platform comprising an upstream end, a base and at least one stiffener extending radially from the base and configured to cooperate with the fan disk, wherein the stiffener comprises a tab in which is formed a first opening wherein the upstream end of the inter-blade platform comprises a wall configured to extend in front of the upstream face of the fan disk, wherein a first hole is formed in the wall;
    a blocking ferrule cooperating with the inter-blade platform, wherein the blocking ferrule is applied and attached to the upstream end of the inter-blade platform and to the upstream face of the fan disk, wherein a second hole is formed in the blocking ferrule;
    a pin configured to penetrate into the first and second holes so as to block the inter-blade platform relative to the fan disk by means of the blocking ferrule; and a socket at least partially housed in the second hole, said socket being configured to abut an upstream face of the upstream end and the pin being at least partially housed in the socket.

12. The fan according to claim 11, further comprising a circlip sleeved over the pin, said circlip extending between the socket and the pin, and a nut threaded over the pin, said nut being attached to the upstream end of the inter-blade platform.

13. The fan according to claim 11, wherein a groove is formed in the upstream face of the upstream end, said groove being configured to cooperate with a head of the socket.

14. The fan according to claim 11, further comprising a circlip sleeved over the pin, said circlip extending between the socket and the pin or a nut threaded over the pin, said nut being attached to the upstream end of the inter-blade platform.

15. The fan according to claim 11, wherein:
the fan disk comprises an angled flange including an axial branch extending axially from an upstream face of the fan disk and a radial branch extending radially from the axial branch; and
the blocking ferrule comprises a bent wall comprising an axial portion extending axially from the radial ring, a radial portion extending radially from the axial portion and a finger extending in the continuation of the axial portion, the finger being configured to radially abut against the axial branch and the radial portion being configured to axially abut against the radial branch.

* * * * *